Aug. 21, 1962 — S. P. TSCHAPPAT — 3,050,312
PACKING GLANDS
Filed Nov. 5, 1959

INVENTOR.
Sheridan P. Tschappat
BY
C. M. McKnight
ATTORNEY

United States Patent Office 3,050,312
Patented Aug. 21, 1962

3,050,312
PACKING GLANDS
Sheridan P. Tschappat, 1201 W. 17th St., Tulsa, Okla.
Filed Nov. 5, 1959, Ser. No. 851,147
2 Claims. (Cl. 277—208)

This invention relates to improvements in packing glands, and more particularly, but not by way of limitation, to a novel cone shaped packing gland member for utilization with stuffing boxes for oil well polished rods, and the like. This application is a continuation-in-part of my co-pending application Serial Number 665,775, filed June 14, 1957, now Patent No. 3,013,831, and entitled, "Packing Glands."

As is well known in the oil industry, many of the producing oil wells are pumped by use of a rod type pump. The pumping unit is usually installed at the bottom of the well bore and is actuated by a string of rods extending downwardly from the surface of the ground. The uppermost rod which projects about the ground and from the well head is commonly called the polished rod. A stuffing box is ordinarily secured to the well head around the polished rod in order to prevent leakage of the pumped oil around the rod. The stuffing box is normally provided with a plurality of packing gland members therein disposed around the polished rod and in contact with the outer periphery thereof, as is well known in the art. During reciprocation of the polished rod, chips or small particles are often worn from the packing glands by the friction developed between the polished rod and the glands. These foreign particles tend to drop downwardly by gravity into the working parts of the pump and can cause serious damage thereto.

The present invention contemplates a novel cone shaped packing gland member so designed and constructed to divert any worn particles from their downward path through the well bore and preclude them from coming in contact with the pump and working parts thereof. The novel packing gland is adapted for disposition around the polished rod at a point below the packing gland members hereinbefore set forth. A tapered surface is provided on the inner periphery of the novel packing gland adjacent the polished rod in order to accumulate any worn particles from the upper packing glands and preclude passage of the particles downwardly from the stuffing box. In addition, an air space or annular chamber is provided on the inner periphery of the novel gland to provide a fluid trap therein for trapping a portion of the pumped oil to assure an adequate lubrication of the polished rod during the reciprocation. The foreign particles from the recessed portion may also be accumulated in the internal chamber to further assure no loss thereof from the stuffing box. It is preferable that the novel packing gland be constructed by means of a molding operation, and the gland is particularly designed to facilitate removal thereof from the mold for enhancing the molding process. The novel packing gland is simple and durable and of an economical construction for greatly prolonging the life of the oil well pump and other working members.

It is an important object of this invention to provide a packing gland for an oil well stuffing box whereby the efficiency of the polished rod may be increased.

It is another object of this invention to provide a novel packing gland for an oil well stuffing box so designed and constructed to preclude worn particles from the gland from dropping downwardly out of the stuffing box and into the well bore, thereby enhancing the operation of the oil well pump.

Another object of this invention is to provide a novel packing gland for an oil well stuffing box wherein a portion of the pumped fluid may be trapped around the outer periphery of the polished rod for assuring an efficient lubrication thereof.

A still further object of this invention is to provide a novel packing gland for an oil well stuffing box which is simple and efficient in operation and durable and economical in construction.

Other objects and advantages of the invention will be evident from the following detailed description, read in conjunction with the accompanying drawings, which illustrate my invention.

Figure 2:
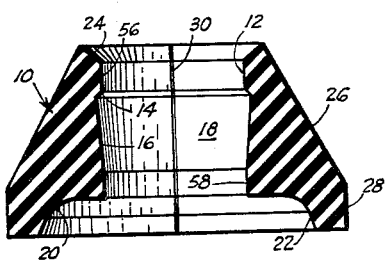
FIGURE 2 is a sectional elevational view of a packing gland embodying the invention.

Referring to the drawings in detail, reference character 10 refers in general to a substantially cone shaped packing gland member preferably constructed of a suitable resilient material, such as rubber, neoprene, or the like, but not limited thereto. The packing member 10 is provided with an inner bore 12 of a diameter substantially the same as the outer diameter of an oil well polished rod for a purpose as will be hereinafter set forth. The bore 12 is provided with an outwardly directed tapered shoulder 14 conterminous with an inwardly directed tapered portion 16 to provide a relieved portion or annular chamber 18. A circular recess 20 is provided at the lower end of the bore 12, as viewed in FIG. 2. The recess 20 is provided with outwardly directed tapered side walls 22 to facilitate removal of the gland 10 from the mold (not shown) during the fabrication thereof. A countersunk portion 24 is provided at the upper end of the bore 12.

The outer periphery of the gland 10 is tapered at 26 in an outwardly and downwardly direction and a substantially straight sided lower portion 28 is provided on the outer periphery of the gland 10 for a purpose as will be hereinafter set forth. A longitudinally extending slit 30 is provided in the gland 10 for facilitating disposition of the packing member around a polished rod 32 of an oil well stuffing box, generally indicated at 34.

Figure 1:
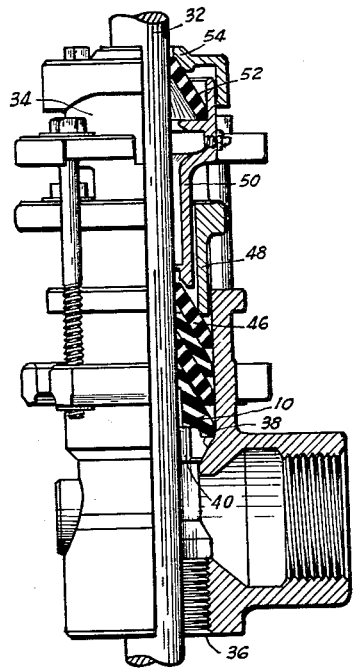
FIGURE 1 is a side elevational view partly in section of a stuffing box provided with the packing gland embodying the invention.
Figure 3:
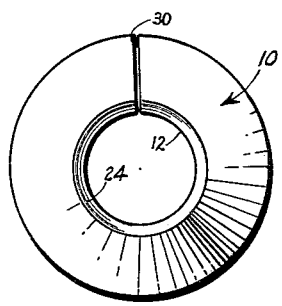
FIGURE 3 is a plan view of a packing gland embodying the invention.

The stuffing box 34 may be of any suitable type, and although the stuffing box depicted herein is generally known as a "T type" duplex stuffing box, the use of the novel gland 10 is not in any manner restricted to the particular structure. The stuffing box 34 may be provided with an internally threaded portion 36 at the lower end thereof for a direct threaded connection with the well tubing (not shown). An inwardly directed tapered shoulder 38 is provided in the stuffing box 34 and spaced above the threaded portion 36 for receiving a gland follower 40, as clearly shown in FIG. 1.

The novel packing gland 10 is preferably disposed in the stuffing box 34 around the polished rod 32 immediately above the follower 40. It is to be understood that the gland 10 may be utilized in stuffing boxes without the follower 40, if desired. The circular recess 20 provides clearance for the follower 40 whereby the gland 10 may be disposed over the follower in such a manner that the straight sided portion 28 is in sealing contact with the inner periphery of the stuffing box 34. A plurality of packing members 46 are normally provided within the stuffing box 34 and disposed around the polished rod 32 for precluding leakage of fluid therearound, as is well known in the industry. An outer packing gland follower member 48 and an inner follower member 50 are usually provided on the stuffing box 34 for exerting a pressure on the packing glands 46 to maintain an efficient seal between the rod 32 and the stuffing box 34. It may be desirable to provide a packing member 52, similar to the packing members 46, at the upper end of the stuffing box 34 and a movable cap member 54 for cooperation with the packing member 52 to provide an additional seal between the polished rod 32 and the stuffing box 34.

Operation

The packing gland 10 is preferably disposed around the polished rod 32 in such a manner that the circular recess 20 is disposed around the follower 40 and the straight wall portion 28 is in sealing contact with the inner periphery of the stuffing box 34. In this manner, the gland 10 is placed within the stuffing box below the packing members 46 as hereinbefore set forth. The internal bore 12 of the gland 10 fits snugly around the outer periphery of the polished rod 32 and functions as a wiping end for the rod to keep paraffin, corrosion, and other undesirable particles from collecting and adhering to the outer periphery of the polished rod. This maintains the outer periphery of the polished rod substantially clean at all times and prevents undue damage to the inner periphery of the packing members 46, thereby greatly prolonging the life thereof. Any particles worn from the inner peripheries of the packing members 46 by the friction caused by the reciprocation of the polished rod 32 will tend to fall downwardly around the rod and are gathered in the counter-sunk portion 24. The reciprocation of the rod tends to move the worn particles downwardly and into the chamber 18 where they will accumulate without dropping further downwardly into the oil well pump (not shown). As hereinbefore set forth, a film of oil is usually present on the outer periphery of the polished rod 32 and will tend to leave a deposit in the chamber 18 with the accumulated worn particles. The lubricant trapped in the chamber 18 will increase the lubrication of the polished rod 32 during its reciprocal action and thereby improve the operation thereof.

It will be apparent that the upper portion 56 of the bore 12 is subjected to a radial pressure as applied to the packing glands 46 in order to maintain the portion 52 tightly engaged with the outer periphery of the polished rod 32. Thus, the portion 56 will be subject to wearing in the same manner as the glands 46, and will release minute foreign particles into the chamber 18 along with the worn particles from the upper packing members. However, there is substantially no radial pressure exerted on the lower portion 58 of the bore 12 below the chamber 18. Thus, the portion 58 will move easily along the outer periphery of the polished rod 32 with substantially no wear, thereby precluding the downward loss of the particles from the chamber 18, as well as precluding the wearing of the bore portion 58 adjacent the rod 32.

The tapered portions 14 and 16 of the bore 12, as well as the tapered side walls 22 of the recess 20, facilitate the removal of the gland 10 from the mold (not shown) during the construction of the gland and greatly facilitate the fabrication thereof.

From the foregoing, it will be apparent that the present invention provides a novel cone shaped packing gland member particularly designed and constructed for use with an oil well stuffing box whereby worn particles of the upper packing gland members will be diverted and precluded from falling downwardly from the stuffing box into the working parts of the oil well pump therebelow. The novel packing gland member also functions as a wiper for cleaning the outer periphery of the polished rod and protecting the upper packing gland members from undue wear.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A molded packing gland for an oil well stuffing box having a reciprocal polished rod, and comprising a substantiallly conical shaped body portion, a slit provided in said body portion for facilitating disposition thereof within the stuffing box and around the polished rod, an internal bore extending longitudinally through the body and having a first wiping portion adapted for engaging the outer periphery of the polished rod under substantial radial pressure for an efficient wiping thereof, said bore having a second wiping portion adapted for engaging the outer periphery of the polished rod under substantially less radial pressure for riding easily therealong for reducing wear upon reciprocation of the polished rod, a tapered recess portion provided in the body above the said first wiping portion for trapping foreign particles wiped from the periphery of the polished rod and directing any of said particles escaping therefrom downwardly through the first wiping portion of the bore, an internal chamber provided in the body and interposed between the wiping portions for trapping lubricant therein and receiving the worn particles escaping from the tapered recess portion and first wiping portion, said second wiping portion precluding further downward movement of the foreign particles from the said internal chamber, and an enlarged recess portion provided in the bore below the said second wiping portion for reducing the radial pressure on the second wiping portion.

2. A molded packing gland as set forth in claim 1 wherein the internal chamber and enlarged recess portion are provided with tapered sidewalls for facilitating the molding fabrication of the packing gland.

References Cited in the file of this patent

UNITED STATES PATENTS

| | | |
|---|---|---|
| 1,313,202 | Mustor | Aug. 12, 1919 |
| 2,721,749 | Crow | Oct. 25, 1955 |
| 2,806,721 | Fagg et al. | Sept. 17, 1957 |
| 2,844,398 | Neher | July 22, 1958 |
| 2,892,643 | Moseley | June 30, 1959 |